United States Patent [19]

Smith

[11] 4,337,617
[45] Jul. 6, 1982

[54] FUEL CONTROL SYSTEM FOR A GAS TURBINE ENGINE

[75] Inventor: Trevor S. Smith, Sutton Coldfield, England

[73] Assignee: Lucas Industries Limited, Birmingham, England

[21] Appl. No.: 147,119

[22] Filed: May 6, 1980

[30] Foreign Application Priority Data

Jul. 13, 1979 [GB] United Kingdom ................ 7924479
Feb. 27, 1980 [GB] United Kingdom ................ 8006552

[51] Int. Cl.³ .............................................. F02C 9/16
[52] U.S. Cl. .............................................. 60/39.28 R
[58] Field of Search ................................... 60/39.28 R

[56] References Cited

U.S. PATENT DOCUMENTS

| 3,092,167 | 6/1963 | Brown et al. | 60/39.28 R |
| 3,138,926 | 6/1964 | McCombs | 60/39.28 R |
| 3,232,053 | 2/1966 | Rogers et al. | 60/39.28 R |
| 3,342,031 | 9/1967 | Bevers | 60/39.28 R |

Primary Examiner—Robert E. Garrett

[57] ABSTRACT

A gas turbine engine fuel control system has a three-dimensional cam which is positioned by sensed values of engine compressor inlet and outlet pressures. The cam has two profiles which respectively indicate a desired ratio of the compressor pressures and a desired fuel flow. Interlinked cam followers engage the respective cam profiles and are also responsive to a device for setting a desired engine thrust. The cam follower linkage positions a variable metering device for the engine fuel supply.

10 Claims, 9 Drawing Figures

FUEL CONTROL SYSTEM FOR A GAS TURBINE ENGINE

This invention relates to fuel control systems for gas turbine engines. For controlling the thrust of a gas turbine engine it is desirable that a fuel control system shall be responsive to air pressures at two locations on the engine compressor, as well as to the operating position of a device by means of which a desired thrust may be selected. Such a system is shown in British Pat. No. 1,231,791.

It is known from the above patent to provide that the response of the system to the aforesaid compressor pressures is effected by a plurality of air pressure regulating valves which are responsive to the aforesaid pressures, and through which air from the engine compressor flows. Air delivered by the compressor is usually hot, and may include contaminants and can thus have an adverse effect on the air pressure regulating valves.

It is an object of the present invention to provide a fuel control system for a gas turbine engine, in which fuel flow is regulated in accordance with air pressures at two locations of the engine compressor, and in which the use of air pressure regulating valves is avoided.

According to the invention there is provided a fuel control system for a gas turbine engine, said control system comprising a variable metering device, selector means for setting a desired thrust of the engine, a first three-dimensional cam movable in response to sensed values of first and second air pressures from the engine compressor, said first cam being profiled as a function of said first and second pressures for a plurality of corresponding sensed values, a second three-dimensional cam movable with said first cam, said second cam being profiled as a function of a plurality of desired fuel flows for corresponding sensed values of said air pressures, first and second cam followers respectively engaging said first and second cam profiles, and a linkage, responsive to the operating positions of said selector means and of said first and second cam followers, for varying the operating position of said metering device.

In a particular embodiment said first and second cam followers are pivotally mounted, and said linkage comprises first and second elements respectively coupled to said first and second cam followers for pivotal movement therewith, and a third pivotally mounted element, the pivotal mountings of said cam followers being carried at respective locations on said third element.

In a preferred embodiment said second cam profile is a logarithmic function of said desired fuel flows, and said metering device includes orifice means for varying the effective flow area of said device exponentially.

In a further preferred embodiment there are provided means for limiting movement of said linkage in respective directions to increase or to decrease fuel flow.

Embodiments of the invention will now be described by way of example only and with reference to the following drawings in which.

Figure 1:
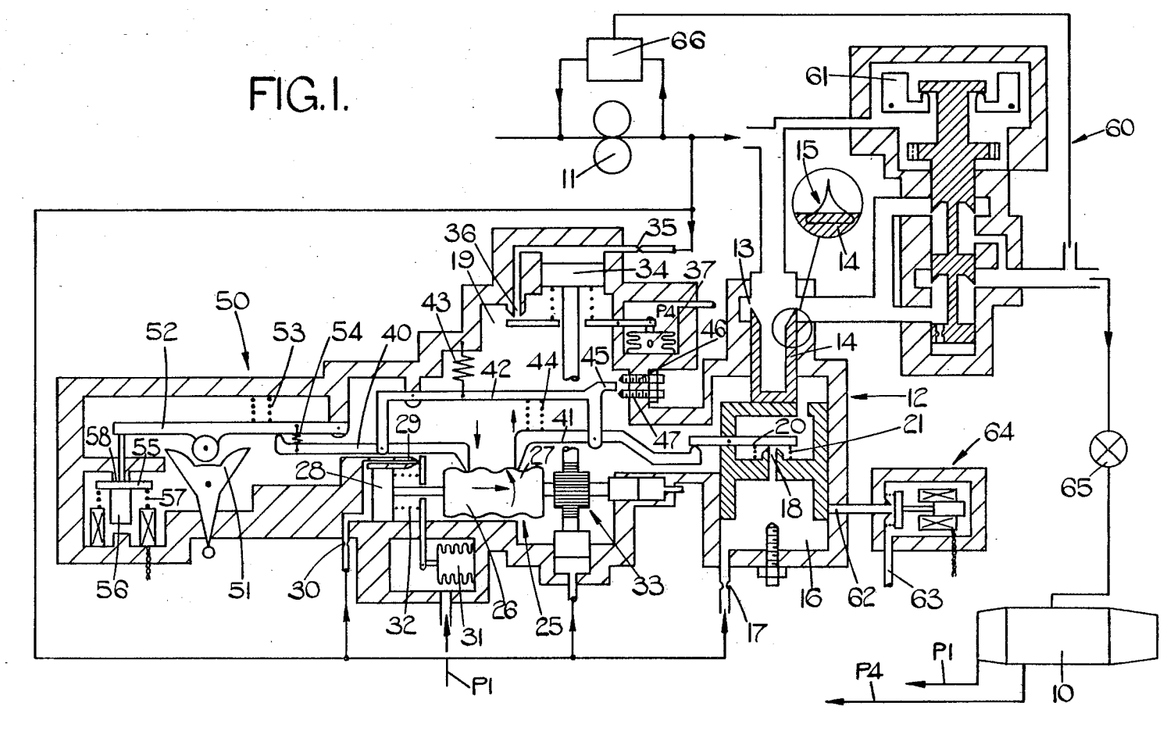
FIG. 1 shows, diagrammatically, a first embodiment of the invention.

As shown in FIG. 1 an engine 10 is supplied with fuel by a pump 11 through a metering device 12. The metering device 12 includes an orifice 13 and a control element 14. The orifice 13 has a profile as indicated at 15, so that exponential variations of fuel flow results from a given linear movement of the control element 14. The control element 14 is responsive to variations in a servo pressure signal in a chamber 16, this servo pressure signal being that between a flow restrictor 17 and a pilot valve 18 which are arranged in series between the outlet of the pump 11 and a low pressure zone 19. A control member 20 for the pilot valve 18 is pivotally mounted on the control element 14 and is biased towards an open position by a spring 21.

A cam element 25 comprises first and second cam portions 26, 27 which are coupled for linear and rotary movement in unison. Linear movement of cam element 25 is effected by a piston 28 actuated by a fuel pressure which is controlled by a valve 29. The valve 29 controls flow from the outlet of the pump 11 to the low pressure zone 19 through a flow restrictor 30. The valve 29 is operable by an evacuated bellows unit 31 to the outside of which is applied a pressure P1 at the inlet of the engine compressor. A spring 32 is engaged between the piston 28 and the control element of valve 29 so that movement of the piston 28 results in a variation of actuating fuel pressure tending to oppose that movement.

Rotary movement of the cam element 25 is effected by a rack and pinion device 33, the rack portion of which is movable by a piston 34 actuable by a fuel pressure derived from the outlet of pump 11 through a flow restrictor 35 and a valve 36. The valve 36 is controlled by an evacuated bellows 37 to the outside of which is applied a pressure P4 from the engine compressor outlet. The cam element 25 is thus positioned axially in accordance with a sensed value of the pressure P1 and angularly in accordance with a sensed value of the pressure P4. The cam portion 26 has a profile which is a logarithmic function of a product of the ratio P4/P1, and a function of P1 for a plurality of the sensed values of P1 and P4. The cam portion 27 has a profile which is a logarithmic function of desired fuel flows for corresponding sensed values of the pressures P1 and P4.

A follower for the cam portion 26 is provided by a lever 40, and a follower for the cam portion 27 is provided by a further lever 41. Levers 40, 41 are pivotally mounted at respective ends of a third lever 42 which is itself pivotally mounted on a relatively fixed part of the apparatus. Lever 42 is biased anticlockwise by a spring 43, and lever 41 is biased into contact with the cam portion 27 by a spring 44. The end of lever 41 remote from the cam portion 27 engages the control member 20 for the pilot valve 18. A projection 45 on the lever 42 can engage an adjustable deceleration stop 46 which limits movement of the lever 42, and hence movement of the lever 41, in a direction which causes control member 20 to close the valve 18, and consequent movement of the control element 14 to reduce fuel flow to the engine. A further adjustable acceleration stop 47 is also engageable by the projection 45 to effect limitation of movement of lever 42 in a direction to increase fuel flow to the engine 10.

A device 50 is operable to select a desired thrust of the engine 10, this thrust being proportional to the ratio P4/P1. The device 50 has a selector cam 51 and a follower lever 52 which is biased into co-operation with the cam 51 by a spring 53. The end of the lever 40 remote from the cam portion 26 is biased into contact with the lever 52 by a spring 54. Movement of the lever 52 in response to the spring 53 can be opposed by a stop 55 which forms part of an electro-magnetic actuator 56, spring 57 biases the stop 55 against an abutment 58. When the actuator is de-energised, anticlockwise movement of lever 52 is limited by stop 55 and the lever 52 does not coact with the cam 51 when the latter is in a central position. This condition corresponds to a high engine idling speed and selects a predetermined thrust requirement. Energisation of the actuator 56 corresponds to a low power engine idling condition and allows the lever 52 to coact with the cam in the central position thereof.

In series with the metering device 12 is a throttle valve 60 which is responsive to a difference between the fuel pressures at the inlet and outlet of the metering device 12, and is also acted upon by a governor device 61 which is driven by a shaft of the engine 10. The arrangement is such that by throttling fuel flow to the engine 10 the valve 60 maintains, for a given speed of the aforesaid engine shaft, a constant pressure difference across the metering device 12. When the control element 14 of the metering device 12 approaches an upper end of its travel it uncovers a port 62 which communicates with a low pressure return line 63 through an electro-magnetic valve 64. When the valve 64 is open, uncovering the port 62 acts to limit the pressure in the chamber 16, and hence to limit upward movement of the element 14. The valve 64 may thus be used to set a minimum fuel flow to the engine 10. A shut-off valve 65 is provided between the valve 60 and the engine 10, and a spill valve 66 is arranged to spill fuel from the outlet of the pump 11 back to the inlet thereof. The spill valve 66 is responsive to the pressure difference across the series arrangement of the device 12 and valve 60, to maintain this pressure difference substantially constant.

In use, during steady running of the engine, that is with the engine thrust approximating to that set by the cam 51, the positions of the cam follower lever 40, and hence the lever 42 will be as shown in the drawing, the projection 45 on the lever 42 being between the stops 46, 47. The logarithmic function of desired fuel flow is sensed by the follower lever 41 and controls the position of the element 14 through the pilot valve 18. If the control element 14 moves to a position in which fuel flow is less than that indicated by the cam portion 27, that is if the element 14 has moved too far upwardly as seen in the drawing, pilot valve 18 is open to reduce the servo pressure signal in chamber 16 and to cause the element 14 to return to a position in which actual fuel flow corresponds to the desired value. Corresponding correction is made if actual fuel flow is greater than the desired value.

If the desired value of the ratio P4/P1 indicated by the selector cam 51 is greater than that indicated by the cam 26, the follower lever 40 pivots clockwise and causes clockwise pivotal movement of the lever 42, and hence of the follower lever 41. Pilot valve 18 opens, allowing the element 14 to move downwardly to a new equilibrium position, thereby increasing fuel flow, and hence engine thrust until the desired pressure ratio P4/P1 is reached. A corresponding decrease in fuel flow is effected if the ratio P4/P1 indicated by the cam 51 is less than that which is indicated by the corresponding sensed values, and derived from the cam portion 26.

Operation of the selector cam 51 to increase or decrease engine thrust causes the lever 42 to be moved clockwise or anticlockwise respectively towards the respective stops 47, 46, the amount of this movement being dependent upon the amount by which the ratio P4/P1 obtained from the cam portion 26 differs from that corresponding to the new selected engine thrust. Under most conditions of acceleration or deceleration of the engine 10 the lever portion 45 will move into contact with the respective stops 47, 46.

The cam portion 26 provides a logarithmic function of the ratio P4/P1, and the effect of the lever 42 is such that the operation position of the follower lever 41 and hence the operating position of the pilot valve control member 20, is the sum of the logarithmic functions provided by the cam portions 26, 27.

The stop 47 sets a maximum acceleration fuel flow for currently sensed values of P4 and P1. Since the stops 46, 47 are a pre-set distance apart, movement of the lever portion 45 between these stops has the effect of subtracting a constant value from the logarithmic function sensed by the follower lever 41 from the cam portion 27. In other words, movement of the lever portion 45 into contact with the stop 46 causes deceleration fuel flow to be a predetermined proportion of the corresponding acceleration fuel flow for the current engine operating conditions.

The linkage is thus required only to provide an algebraic sum, and the need for multiplying mechanisms is avoided. Additionally, the need for a separate cam which provides a deceleration control schedule is avoided.

The exponential profile 15 of the orifice 13 cooperates with the log functions provided by the cam portions 26, 27 so that the effective flow area of the orifice 13 varies linearly with the desired fuel flow.

It is desirable that the gain of the system, that is its response to relatively small changes in the position of the first, steady running, cam follower, shall be as large as possible, and in the system described above the gain is obtained by means of a high lever ratio between the first and second cam followers. This high lever ratio introduces the possibility that the cam follower lever 40 may move out of contact with the cam 25, as a result of vibrations from the engine 10. Applying an increased spring bias to overcome this effect may result in unacceptable cam wear. The embodiment shown in FIGS. 2 to 8 provides a system of overcoming these difficulties.

Figure 2:
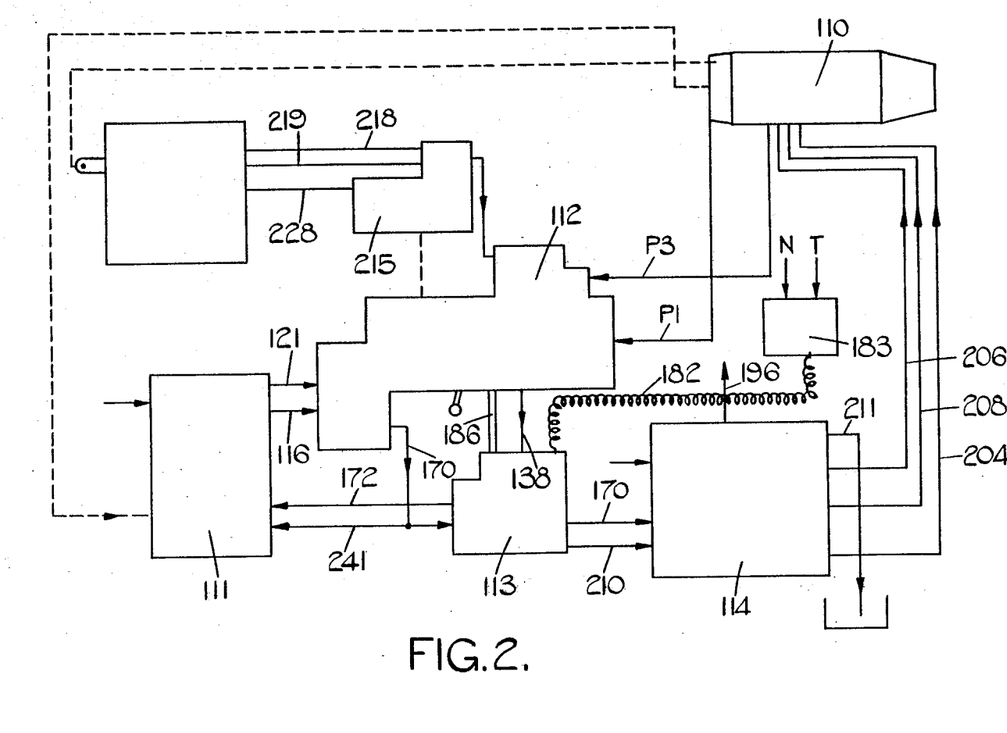
FIG. 2 is a block diagram of a second embodiment of the invention.

While FIG. 2 is a block diagram of the embodiment as a whole, and FIGS. 3 to 8 are component parts thereof. FIGS. 2 to 8 should be read in conjunction, corresponding parts having identical reference numerals.

Figure 5:
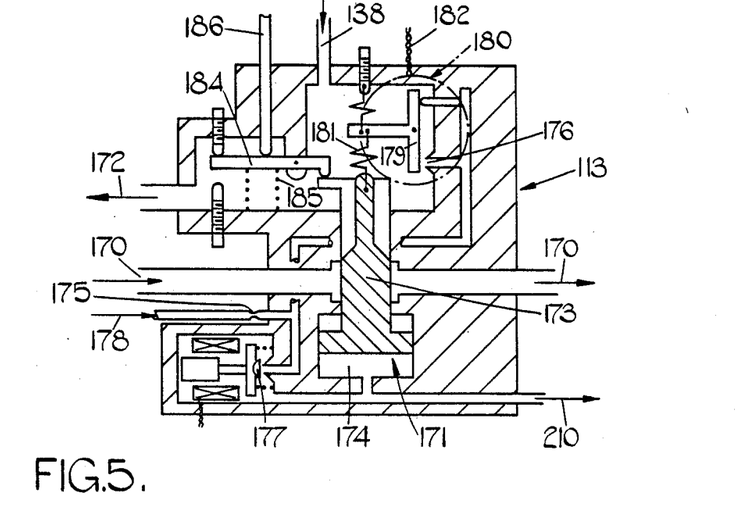
FIG. 5 is a flow modifying device associated with the metering arrangement of FIG. 3.
Figure 6:
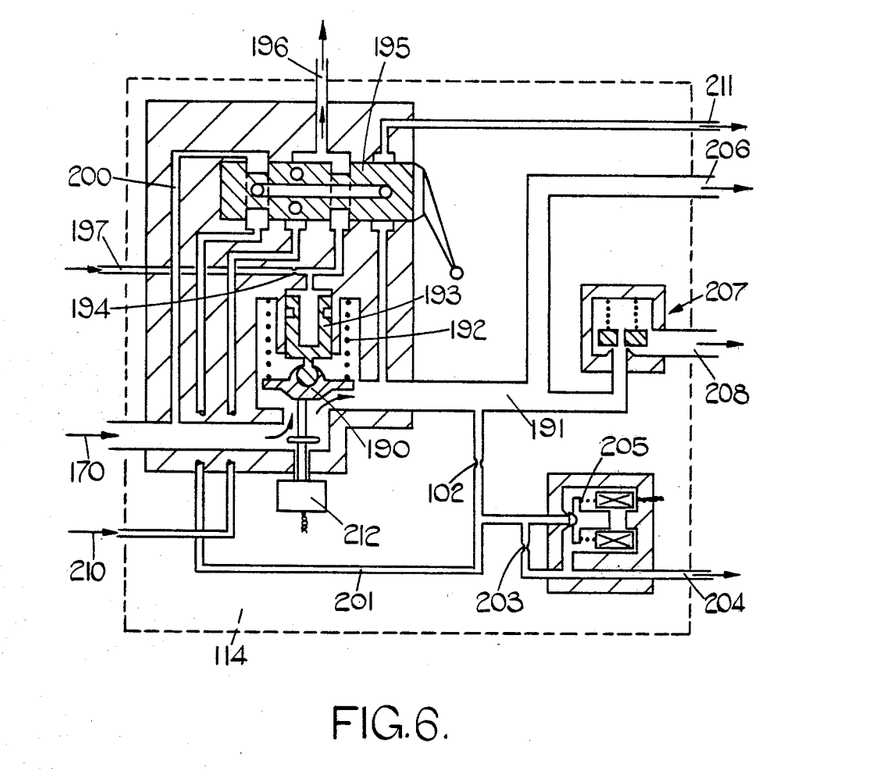
FIG. 6 is a shut-off valve arrangement of the system of FIG. 2.

As shown in FIG. 2 a gas turbine engine 110 is supplied with fuel by the pump arrangement 111 (FIG. 4) through the metering arrangement 112 (FIG. 3), the flow modifying device 113 (FIG. 5) and the shut-off valve arrangement 114 (FIG. 6).

Figures 3, 3A:
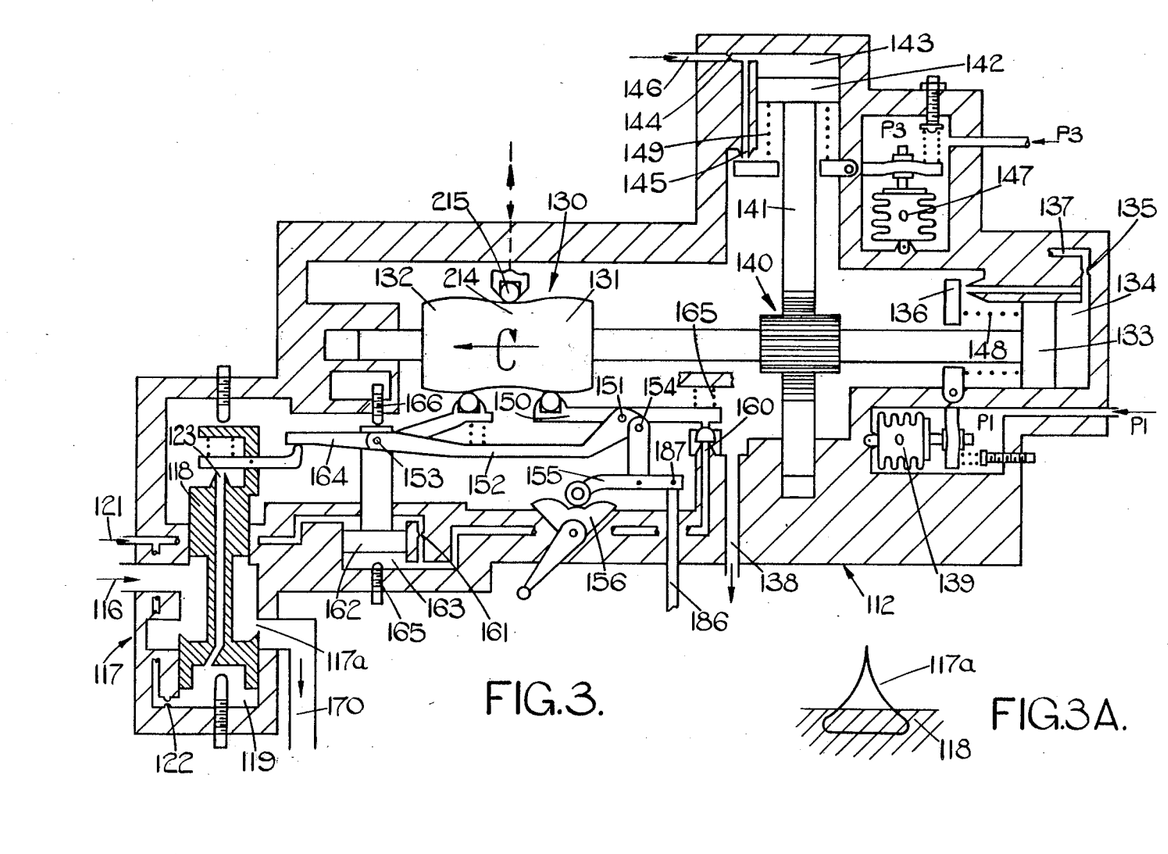
FIG. 3 is a diagram of a metering arrangement for the system of FIG. 2.
Figure 4:
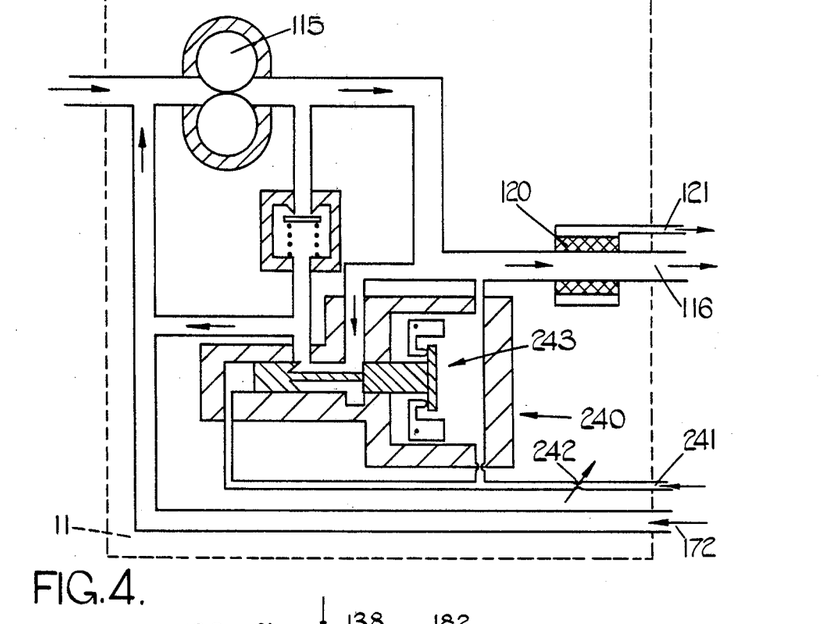
FIG. 4 is a diagram of a pump arrangement for the system of FIG. 2.

A pump 115 in the arrangement 111 delivers fuel through a supply line 116 to the metering arrangement 112. As shown in FIG. 3 the arrangement 112 includes a metering valve 117 having a control element 118 responsive to a servo pressure in a chamber 119. The metering orifice 117a of the valve 117 has an exponential profile as indicated at FIG. 3A, so that exponential variation of fuel flow results from linear movement of the control element 118. The pressure in chamber 119 is derived from that in the line 116 through a filter 120 (FIG. 4), a line 121, a flow restrictor 122 and a valve 123, the valve 123 being operated in a manner later to be described.

A three-dimensional cam 130 has first and second cam portions 131, 132 which are coupled for linear and rotary movement in unison. Linear movement of the cam 130 is effected by a piston 133 responsive to a servo pressure in a chamber 134, this pressure being that between a flow restrictor 135 and a valve 136 which are in series in a line 137 between the line 121 and a low pressure return line 138. The valve 136 is operable by a evacuated bellows 139 which is subjected externally to the pressure P1 at the inlet of the compressor of the engine 110. A feedback spring 148 is located between the valve 136 and piston 133.

The cam 130 is rotatable by a rack and pinion device 140, the rack 141 being movable by a piston 142 responsive to the pressure in a chamber 143 intermediate a restrictor 144 and a valve 145, the restrictor 144 and valve 145 being in series in a line 146 between the line 121 and the low pressure return line 138. The valve 145 is operable by an evacuated bellows 147 responsive to the delivery pressure P3 of the engine compressor and is acted on by a feedback spring 49 which also engages the piston 142.

The cam 130 is thus positioned axially in accordance with pressure P1 and angularly in accordance with pressure P3. The cam portion 131 has a profile which corresponds to a logarithmic function of the term f (P1). P3/P1 that is to a product of the ratio P3/P1 and a function of P1, for a plurality of the sensed values of P1 and P3. The cam portion 132 has a profile which is a logarithmic function of desired fuel flows for corresponding sensed values of P3 and P1. A cam follower lever 150 for the cam portion 131 is mounted for movement about a pivot 151, the pivot 151 being carried adjacent one end of a link 152 whose other end is supported by a pivot 153. The end of the link 152 remote from the pivot 153 is supported on a further pivot 154 whose distance from the pivot 153 is slightly greater than that of the pivot 151. The pivot 154 is carried by a lever 155 which co-operates with an edge cam 156 which is operable to set a desired thrust of the engine 110, this thrust being proportional to the ratio P3/P1.

The end of the cam follower lever 150 remote from its zone of engagement with the cam 130 controls a valve 160 which is in series with a flow restrictor 161 between the lines 121, 138. An actuator 162 is responsive to the pressure in a chamber 163 between the valve 160 and restrictor 161, and the actuator 162 carries the pivot 153 of the link 152. Also mounted on the pivot 153 is a second cam follower lever 164 which engages the portion 132 of the cam 130 and also co-operates with the control element of the valve 123. Movement of the actuator 162 is limited by adjustable stops 165, 166 which respectively set limits to acceleration and deceleration fuel flows.

In use, when the position of the cam 130 in response to sensed values of P1 and P3 is such that the cam follower 150 senses the correct thrust, as indicated by the function of P3 and P1, corresponds to the thrust selected by the edge cam 156, the system is in equilibrium and the actuator 162 is stationary. This equilibrium position of the actuator 162 is stationary. This equilibrium position of the actuator 162 will, as a result of the aforesaid logarithmic functions of the cam portions 131, 132 and the exponential profile of the metering orifice 117a, be the same for all values of selected thrust, providing that the sensed values of P3 and P1 correctly correspond to the selected thrust. In this condition the cam follower 164 is positioned in accordance with desired fuel flow for the selected thrust and operates the valve 123 to position the control element 118, of the metering valve 117. The control member of the valve 123 is itself carried by the control element 118, and thus provides a feedback connection, whereby the control element 118 assumes an equilibrium position corresponding to the appropriate fuel flow.

If the cam 156 is moved in a direction to require an increased engine thrust the cam follower moves anticlockwise as seen in FIG. 3, increasing flow through the valve 160 and allowing the actuator 162, and hence the pivot 153, to move downwardly against the stop 165. This movement of the pivot 153 results in anticlockwise movement of the cam follower 164, opening the valve 123 and moving the metering valve to increase fuel flow. Downward movement of the pivot 153 causes movement of the pivot 151 anticlockwise about the pivot 154, urging the cam follower lever 150 clockwise to shut the valve 160. The link 152 thus provides a feedback between the position of the actuator 162 and the valve 160 and ensures that movement of the pivot 153 is proportional to that of the valve 160. Since movement of the actuator 162 is a time integral of flow through the valve 160, the arrangement can provide a high gain and a rapid response to movement of the cam 150. The cam follower 150 is biased into engagement with the cam portion 131 by a relatively light spring 165, which also serves to urge the valve 160 shut. The force from the spring 165 is the only force applied by the cam follower 150 to the cam 130 and where is thus greatly reduced.

It will be understood that movement of the cam 156 in a direction to reduce engine thrust will result in upward movement of the actuator 162 against the stop 166, urging the valve 123 shut and reducing flow through the valve 117. In either acceleration or deceleration fuel flow is changed until actual and desired thrusts again correspond. Since the position of the pivot 153 corresponds to the logarithmic function provided by the cam portion 131, the position of valve lever 123 corresponds to the sum of this logarithmic function and that of the logarithmic function provided by the cam portion 132. During acceleration or deceleration, therefore, predetermined logarithmic functions as represented by engagement of the actuator 162 with the respective stops 165, 166 are added to the logarithmic fuel flow function derived from the cam portion 132. The effect is thus to multiply the steady-state fuel flow by the respective acceleration or deceleration factors.

An outlet line 170 from the valve 117 communicates with an inlet of the flow modifying device 113, shown in FIG. 5. The device 113 includes a spill valve 171 which is operable to connect the fuel supply line 170 to a return line 172 which communicates through the arrangement 111 with the inlet of the pump 115. The spill valve 171 has a control element 173 responsive to the pressure in a chamber 174, this pressure being that intermediate a restrictor 175 and a valve 176 and being applied by way of a solenoid valve 177. The valve 177 is biased so as to be open in its de-energised state and thereby to permit flow to and from the chamber 174. The restrictor 175 and valve 176 are in series in a line 178 between the line 121 and the return line 172. The valve 176 has a control element 179 which is rotatable in either direction from a central position (shown) by a torque motor indicated at 180. The control element 173, 179 of the valves 171, 176 respectively are coupled by a spring 181 to provide a negative feedback connection. The torque motor 180 is responsive to signals on connectors 182 from a control circuit 183 (FIG. 2). The circuit 183 is responsive to unacceptably high level of an engine speed N or an engine temperature T to provide control signals which cause the torque motor 180 to move the control element 179 clockwise, thereby causing the control element 173 to spill fuel from the supply line 170 to the return line 172. The control circuit 183 is also responsive to values of engine speed N and temperature T to cause the torque motor 180 to move the control element 179 anticlockwise, moving the control element 173 upwardly. This upward movement of control element 173 has no effect in spilling fuel, but urges a lever 184 against a spring 185 to permit downward movement of a stem 186. The stem 186 carries a pivot 187 for the lever 155 (FIG. 3). Response of the system to the thrust selected by the cam 156 may thus be trimmed in accordance with values of speed N and temperature T applied to the control circuit 183.

The fuel supply line 170 communicates with the shut-off valve arrangement 114 (FIG. 6). The arrangement 114 has a closure member 190 between the fuel supply line 170 and a fuel delivery line 191. The member 190 is biased towards a shut position by a spring 192 which exerts the force such that the member 190 can be urged open by an adequate fuel pressure in the line 170. The member 190 thus acts as a pressure-raising valve which ensures that fuel pressure will be adequate to ensure operation of the various servo systems before delivery to the engine takes place. The closure member 190 is engaged with a piston 193 which is responsive to the pressure between a restrictor 194 and a two-position cock 195. The cock 195 is shown in a position corresponding to engine running, in which position the piston 193 is subjected to the low pressure in a line 196. In the other position of the cock 195 the piston 193 is subjected to the high pressure in a line 197 communicating with the line 121 (FIG. 4), whereupon the piston 173 and closure member 190 are urged downwardly to shut off direct connection between the lines 170, 191.

In the position shown of the cock 195, the line 170 can communicate with the line 191 through a passage 200, ports in the cock 195 a passage 201 and a restrictor 202, thereby permitting engine priming when the closure member 190 is in its shut position. The passage 201 communicates through a restrictor 203 and a line 204 with the engine igniters the restrictor 203 does not, however, permit a sufficient igniter fuel flow for engine starting, and a normally-shut solenoid valve is arranged in parallel with the restrictor 203 and is energisable during engine starting.

The fuel delivery line 191 communicates with an upper manifold of the engine 110 through a line 206, and also with a lower manifold of the engine 110 through a weighted distributor valve 207 and a line 208.

In the illustrated position of the cock 195, a passage 210 from the chamber 171 of the flow modifying device 113 (FIG. 5) is shut off. In the alternative position of the cock 195, corresponding to engine shut-down, the passage 210 communicates with the low pressure line 196 and the spill valve 171 opens to return fuel to the inlet of the pump 115. Finally, in the shut-down position of the cock 195 the fuel delivery line 191 communicates with a low pressure drain passage 211. An electrical indicator device 212 provides an indication when the member 190 is in its shut position, that is when main fuel flow to the engine 110 is shut off.

Figure 7:
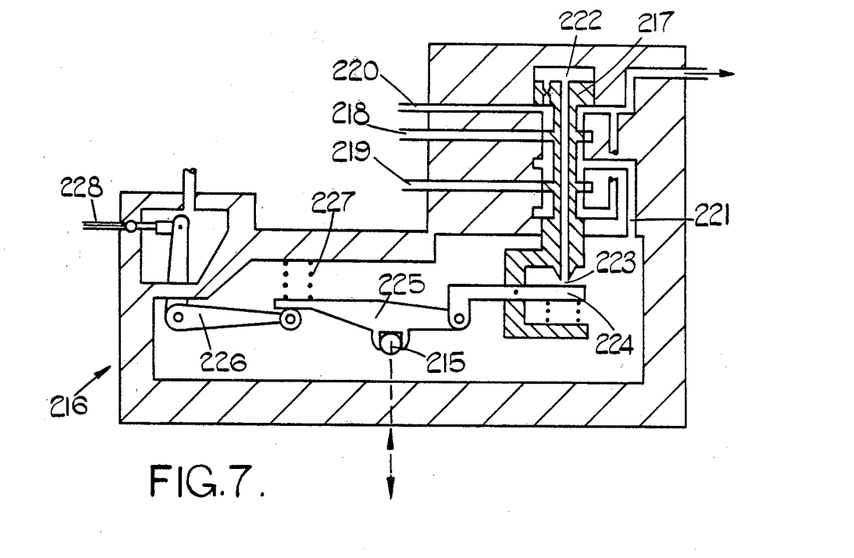
FIG. 7 is a servo pressure control device associated with the metering arrangement of FIG. 3.

The cam 130 (FIG. 3) has a further portion 214 which is engaged by a further cam follower 215 which is also indicated as part of a servo pressure control device 216 (FIG. 7). The device 216 includes a spool control valve 217 which is axially movable to apply a high pressure to either one of a pair of control lines 218, 219 and to apply a low pressure to the other of these lines. The high pressure is derived from that in a line 220 which communicates with the line 121 (FIG. 4) and the low pressure is derived from that in a line 221 which communicates with the low pressure return line 138 (FIG. 3). The valve 217 is position by a servo pressure in a chamber 222, this pressure also being derived from that in the line 220 and being controlled by a valve 223 which has a control member 224 pivotally mounted on the spool of the valve 217. The control member 224 pivotally engages one end of a lever 225 whose pivot is provided by the cam follower 215 and which is biased in an anticlockwise direction, into engagement with a cranked lever 226, by a spring 227.

Figure 8:
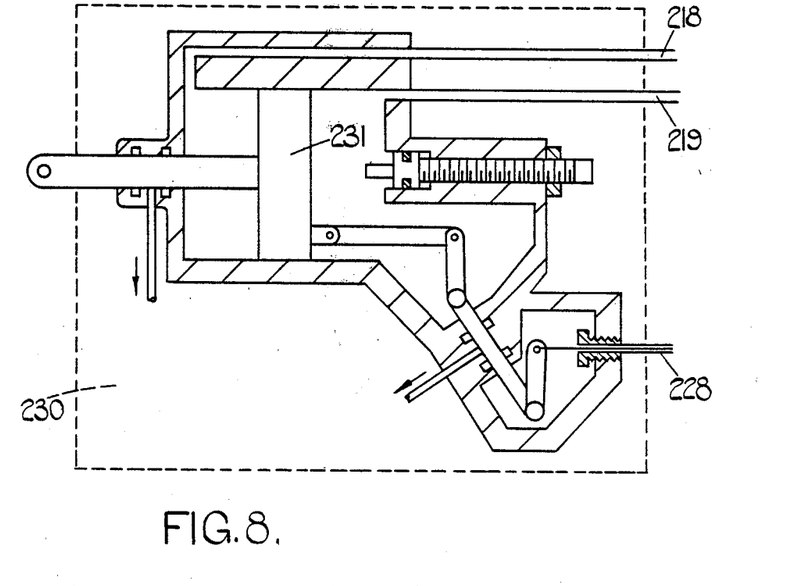
FIG. 8 is an actuator, responsive to the servo pressure from the device of FIG. 3, for the inlet guide vanes of the engine.

The lines 218, 219 communicate with a double-acting piston and cylinder arrangement which provides an actuator device 230 for the inlet guide vanes of the compressor of the engine 110. The position of the piston 231 of this arrangement is fed back to the cranked lever 226 through a sheaved cable 228. Assume that the piston 231, and hence the cranked lever 226 are initially stationary, upward movement of the cam follower 215 moves the lever 225 anticlockwise, opening the valve 223 and causing the spool valve 217 to move upwardly under the influence of the pressure in line 220 and thereby applying a high pressure to the line 219. The resulting leftward movement of the piston 231 moves the crank lever 226 anticlockwise, restoring the lever 225 and valve 217 to an equilibrium position shown.

The pump arrangement 111 (FIG. 4) includes a spill valve 240 between the outlet and inlet of the pump 115. The valve 240 is urged shut by the pressure in a line 241 which communicates with the fuel supply line 170 and includes a variable flow restrictor 242. The valve 240 is urged open by the pressure in the fuel line 116. The valve 240 is thus positioned in accordance with the pressure difference across the metering valve 170 and is also responsive to a governor device 243 which is driven at a speed N of the engine 110. The arrangement is such that for any given speed the valve 240 maintains the pressure difference across the valve 117 substantially constant. This pressure difference being permitted to rise with increasing engine speed.

It is known to control the thrust of a gas turbine engine by regulating fuel flow in accordance with functions of pressures at locations of the engine compressor. As shown in British Pat. No. 1,469,926 these functions can be relatively complex, and have hitherto been derived by passing airflows from the compressor through a series of regulating orifices. The systems of the present application derive the required control functions without the need for flow of hot compressor gases through the control system, whereby the several parts of the system need not be constructed of materials which will withstand hot gas, and any contaminants in the gas. There is, moreover, no need to provide cooling devices which have previously been used in thrust control systems. A considerable weight saving is thereby achieved.

The use of three-dimensional cams has been found to be a particularly effective way of generating the aforesaid control functions in response to two compressor pressures.

I claim:

1. A fuel control system for a gas turbine engine, comprising a variable metering device, selector means for setting a desired thrust of the engine, a first three-dimensional cam movable in response to sensed values of first and second air pressures from the engine compressor, said first cam being profiled as a function of said first and second pressures for a plurality of corresponding sensed values, a second three-dimensional cam movable with said first cam, said second cam being profiled as a function of a plurality of desired fuel flows for corresponding sensed values of said air pressures, first and second cam followers respectively engaging said first and second cam profiles, and a linkage, responsive to the operating positions of said selector means and of said first and second cam followers, for varying the operating position of said metering device.

2. A system as claimed in claim 1 in which said linkage includes means for providing that the operating position of said second cam follower corresponds to the sum of the functions of the profiles of said first and second cams.

3. A system as claimed in claim 2 in which said first and second cam functions are logarithmic functions.

4. A system as claimed in claim 3 in which said variable metering device has an orifice having an exponential profile which provides means for co-operating with said logarithmic functions to render the effective flow area of said device linearly variable with a desired fuel flow which is indicated by said second cam.

5. A system as claimed in any preceding claim in which said first and second cam followers are pivotally mounted levers, said linkage including a lever interconnecting the pivotal axes of said first and second cam followers, and said selector means is operable to move the pivotal axis of said first cam follower whereby said first lever is positioned in accordance with said desired thrust and said function of the first and second pressures.

6. A system as claimed in claim 5 which includes a valve controlled by said first cam follower for regulating a servo pressure, and an actuator movable in response to changes in said servo pressure, said pivotal axis of the second cam follower being movable by said actuator.

7. A system as claimed in any of claims 1, 2, 3 or 4 which includes a pilot valve operable by said second cam follower to vary a servo pressure signal, said variable metering device being responsive to said servo pressure signal.

8. A system as claimed in any of claims 1, 2, 3 or 4 which includes means, responsive to a predetermined level of an engine operating condition, for spilling fuel from a fuel supply line in which said variable metering device is located.

9. A system as claimed in claim 8 which includes trimming means responsive to an engine operating condition, for moving the pivotal axis of said first cam follower.

10. A system as claimed in claim 8 which includes a control element movable in response to said engine operating condition, said control element forming a spill valve between said fuel supply line and a low pressure return line, said control element also being operably connected to said first cam follower to vary the position of the pivotal axis thereof.

* * * * *